United States Patent
Rydén et al.

(10) Patent No.: US 12,216,639 B2
(45) Date of Patent: Feb. 4, 2025

(54) METHODS FOR PROCESSING DATA SAMPLES IN COMMUNICATION NETWORKS

(71) Applicant: Telefonaktiebolaget LM Ericsson (publ), Stockholm (SE)

(72) Inventors: Henrik Rydén, Stockholm (SE); Joel Berglund, Linköping (SE); Alexandros Palaios, Herzogenrath (DE); Reza Moosavi, Linköping (SE); Abdulrahman Alabbasi, Kista (SE); Ricardo da Silva Souza, Indaiatuba (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/035,576

(22) PCT Filed: Dec. 4, 2020

(86) PCT No.: PCT/EP2020/084706
§ 371 (c)(1),
(2) Date: May 5, 2023

(87) PCT Pub. No.: WO2022/117213
PCT Pub. Date: Jun. 9, 2022

(65) Prior Publication Data
US 2023/0394032 A1    Dec. 7, 2023

(51) Int. Cl.
*G06F 16/23* (2019.01)
(52) U.S. Cl.
CPC .............................. *G06F 16/2365* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 2014/0233408 A1* | 8/2014 | Bontu | H04W 24/10 370/252 |
| 2019/0026430 A1* | 1/2019 | Grouchy | G16B 40/20 |

(Continued)

FOREIGN PATENT DOCUMENTS

WO    2020226542 A1    11/2020

OTHER PUBLICATIONS

International Search Report and Written Opinion of the International Searching Authority, PCT/EP2020/084706, mailed Jul. 22, 2021, 10 pages.

(Continued)

*Primary Examiner* — Van H Oberly
(74) *Attorney, Agent, or Firm* — Sage Patent Group (57) ABSTRACT

A computer-implemented method for acquiring new data samples and for maintaining a set of data samples in a database, wherein the set of data samples are configured to form input to a function associated with a predictive performance, the method including obtaining at least one relevance metric (M), where the relevance metric is indicative of an increase in the predictive performance of the function when using a data sample as input together with the set of data samples compared to when not using the data sample, obtaining a relevance criterion (C), where the relevance criterion identifies relevant data samples in a set of data samples based on the at least one relevance metric, signaling the at least one relevance metric (M) and the relevance criterion (C) to a data collecting network node.

19 Claims, 4 Drawing Sheets

(56) References Cited

U.S. PATENT DOCUMENTS

| | | | |
|---|---|---|---|
| 2020/0134363 A1* | 4/2020 | Hubenig | G06N 20/00 |
| 2020/0313989 A1 | 10/2020 | Biller et al. | |
| 2020/0351173 A1* | 11/2020 | Vasseur | H04L 41/16 |
| 2020/0386851 A1* | 12/2020 | Eakins | G01S 11/10 |
| 2021/0232968 A1* | 7/2021 | Ferreira | G06N 3/045 |

OTHER PUBLICATIONS

Gong, Zhiqiang et al., "Diversity in Machine Learning," arXiv.org, arXiv:1807.01477v1, Jul. 4, 2018, 41 pages.
Burda, Yuri et al., "Exploration by Random Network Distillation," arXiv.org, arXiv:1810.12894v1, Oct. 30, 2018, 17 pages.
CMCC, "New SID: Study on further enhancement for data collection," 3GPP TSG RAN Meeting #88e, RP-201304, Jun. 29-Jul. 3, 2020, 4 pages.

* cited by examiner

METHODS FOR PROCESSING DATA SAMPLES IN COMMUNICATION NETWORKS

CROSS REFERENCE TO RELATED APPLICATIONS

This application is a 35 U.S.C. § 371 national stage application of PCT International Application No. PCT/EP2020/084706 filed on Dec. 4, 2020, the disclosure and content of which is incorporated by reference herein in its entirety.

TECHNICAL FIELD

The present disclosure relates to methods for storing, modifying and/or signaling one or more data samples in a communication network. There are disclosed methods and devices for reducing signaling and data processing overhead associated with data collection in wireless communication networks. The disclosed methods are particularly suitable for use with machine learning methods and systems comprising aspects of artificial intelligence, such as neural networks, autoencoder networks and the like, which often require large amounts of data to function efficiently.

BACKGROUND

Machine learning (ML) is a technique that can be used to find a predictive function for a given dataset; the dataset is typically a mapping between a given input to an output. The predictive function (or mapping function) is generated in a training phase, where during the training phase it is typically assumed that both the input and output are known. The test phase then comprises predicting the output for a given input.

ML applications are becoming ever more popular in radio access networks (RAN) as they allow performance enhancements by utilizing information available in the networks. One such example is secondary carrier prediction (SCP), where information on one or more carriers can be used to predict the coverage on other frequencies, thus allowing improved choices of frequencies for handover, carrier aggregation (CA), idle mode configuration, and the like.

Data sample collection is at the heart of AI and ML. Even though cloud solutions are gaining momentum, there are cases when data needs to be stored locally, for example due to privacy reasons or difficulty/cost of transporting data. Storing ML models and especially the data samples required for training and operation can however be a problem as the hardware can be very expensive and over dimensioning storage can have a severe impact on the total cost and energy consumption of a predictive function.

Finding the most relevant data samples to store and identifying data samples which can be ignored or even discarded is a challenge. One would like to find the samples that provide the overall best predictive performance, by having an accurate representation of the environment. In case the ML model is trained in a network node separate from the node that is generating the data for the model, there is a risk that the signaling overhead will be prohibitive. This is in particular troublesome if the data needs to be sent wirelessly from a wireless device to a data processing network node.

There is a need for improved methods for processing data samples in communication networks.

SUMMARY

It is an object of the present disclosure to provide improved methods for processing data samples in communication networks which mitigate at least some of the above-mentioned issues.

This object is at least in part obtained by a computer-implemented method, performed in a data processing network node, for acquiring new data samples and for maintaining a set of data samples in a database, wherein the set of data samples are configured to form input to a function associated with a predictive performance. The method comprises obtaining at least one relevance metric M, where the relevance metric is indicative of an increase in the predictive performance of the function when using a data sample as input together with the set of data samples compared to when not using the data sample. The method also comprises obtaining a relevance criterion C, where the relevance criterion identifies relevant data samples in a set of data samples based on the at least one relevance metric. The method further comprises signaling the relevance criterion to a data collecting network node and receiving one or more data samples from the data collecting network node, where the received data samples are associated with relevance metrics that satisfy the relevance criterion.

This way the relevance of the reported data samples is increased, at least on average, which means that the prediction function becomes more efficient overall. The need to transport data, e.g., across wireless links in a communication network decreases without significantly impacting the predictive function performance, which is an advantage. The techniques disclosed herein allow the information in the data samples to be collected, stored, and processed in a more condensed and efficient way as the most informative parts of the samples are extracted, allowing the gains that higher number of samples provide, such as increased performance by better ML models, while having a lower memory and/or energy footprint. Communications resources are conserved since less data samples need to be communicated between the data collecting network node and the data processing network node. The signaling of data for training the various machine learning models comprised in a predictive function can be reduced to include the most informative samples, this is of high importance especially if the first node needs to signal over a wireless channel.

According to some aspects, the method comprises sending the at least one relevance metric to the data collecting network node. This allows the data processing network node to also customize the relevance metric, which is an advantage. Alternatively, or in combination, the relevance metric or parts thereof is pre-configured at the data collecting network node. This way the data processing network node does not have to configure a relevance metric for all data collecting network nodes which may be an advantage. Also, the relevance metric can be pre-configured as a default relevance metric to be used at the data collecting network node, which default metric can be re-configured by the data processing network node, or by some other network node, if required for the data processing task at hand.

According to aspects, the method also comprises training a machine learning model arranged to indicate the predictive performance associated with a data sample in a set of collected data samples, wherein the machine learning model constitutes a relevance metric. Thus, the method allows for relatively advanced forms of relevance metrics, which can be customized in order to increase the performance of the data sample processing.

According to aspects, the method comprises training a machine learning model arranged to indicate a novelty metric associated with a data sample in a set of collected data samples, wherein the machine learning model constitutes a relevance metric. This ML model can be configured to indicate the novelty of a given data sample in an efficient yet robust manner. The machine learning model can also be updated based on the received one or more data samples, thus keeping the model up to date and maintaining a high degree of performance by the predictive function. The method may furthermore comprise updating the function associated with a predictive performance based on the received one or more data samples, thus keeping the predictive function relevant for the data processing task at hand.

The at least one relevance metric optionally comprises a distance metric configured to quantify a distance between one or more data samples in a set of collected data samples and a set of samples in the database. According to another example, the at least one relevance metric comprises a reconstruction error metric value obtained from an autoencoder model, and/or a prediction error metric value obtained from a machine learning (ML) model. Thus, it is appreciated that the methods disclosed herein are general in the sense that many different types of relevance metrics can be used, separately or in combination.

According to aspects, the at least one relevance metric is based on a cyclo-stationarity operation configured to indicate a similarity between one or more data samples in a set of collected data samples and a set of basic patterns. The cyclostationarity operation is particularly suitable for indicating similarity between captured time-sequences of data and a set of baseline time sequences, as will be explained in more detail below. The cyclo-stationarity operation may, for instance, be an auto-correlation function or a cross-correlation function.

According to aspects, the method comprises receiving one or more relevance metrics associated with the data samples received from the data collecting network node.

The object is also at least in part obtained by a computer-implemented method, performed in a data collecting network node, for acquiring new data samples and for maintaining a set of data samples in a database at a data processing network node, wherein the set of data samples forms input to a function associated with a predictive performance. The method comprises obtaining at least one relevance metric M, where the relevance metric is indicative of an increase in the predictive performance of the function when using the new data sample as input, and also receiving a relevance criterion C from the data processing network node, where the relevance criterion identifies relevant data samples in a set of data samples based on the at least one relevance metric. The method also comprises collecting a set of collected data samples by the data collecting network node, selecting one or more relevant data samples from the set of collected data samples based on the relevance metric and on the relevance criterion, where the relevant data samples are associated with relevance metrics meeting the relevance criterion, and transmitting the one or more selected data samples to the data processing network node. As discussed above, the at least one relevance metric can be pre-configured, e.g., as a default relevance metric, and/or it can at least in part be received from the data processing network node.

According to aspects, the relevance metric comprises a machine learning model arranged to indicate a predictive performance associated with a data sample in the set of collected data sample. This relevance metric is quite general and versatile and can be used in a wide variety of different data sample processing operations, which is an advantage.

According to aspects, the selecting comprises any of: adding the one or more relevant data samples to the database, deleting one or more previously collected data samples from the database, increasing a data sample importance metric value associated with a data sample in the database, and/or creating one or more artificial data samples with a specified data sample importance metric value by combining one or more collected data samples with one or more data samples in the database. Thus, a wide variety of data sample processing operations are supported, which is an advantage.

According to aspects, the method comprises triggering data sample selection and transmission based on a trigger criterion comprising any of a change in mode of operation, a memory status, and/or based on an external instruction. This way the data offloading can be efficiently controlled, which is an advantage.

According to aspects, the method comprises transmitting a data sample relevance metric value and/or data sample importance metric value, associated with the selected data samples to the data processing network node. This sample relevance metric finds multiple uses, as will be discussed in the following. For instance, it can be used to indicate to the data processing network node that a given sample is deemed more relevant compared to others. It can also be used to indicate that some pre-processing has been performed at the data collecting network node. For instance, the method optionally comprises transmitting data indicative of a number of added and/or deleted data samples of the database to the data processing network node, and/or transmitting information indicative of one or more generated artificial data samples in the database to the data processing network node.

There are also disclosed herein processing units, network nodes, and computer program products associated with the above-mentioned advantages.

BRIEF DESCRIPTION OF THE DRAWINGS

The present disclosure will now be described in more detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

The concept of a data sample is herein given a broad interpretation. A data sample can, for instance, be defined as a set of features with or without a target variable in a certain radio network operation. For example, in case of SCP, the sample could include the features (source carrier measurements), and the target (secondary carrier measurements). A data sample can also be a piece of data together with an associated data relevance metric, or just a measurement value of some parameter of interest. A time series and/or frequency series of collected data may also be referred to as a data sample herein.

Figure 1:
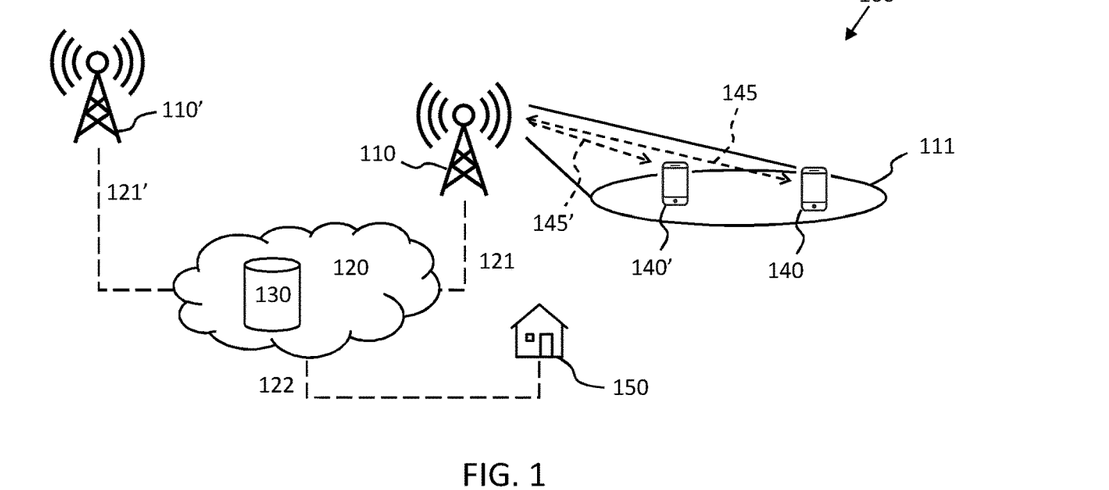
FIG. 1 illustrates an example communication network.

FIG. 1 illustrates an example communication network 100 where access points 110, 110' provide wireless network access to wireless devices 140, 140' over a coverage area 111. An access point in a fourth generation (4G) 3GPP network is normally referred to as an evolved node B (eNodeB), while the access points in a fifth generation (5G) 3GPP network are often referred to as a next generation node Bs (gNodeB). The access points 110, 110' are connected to some type of core network 120, such as an evolved packet core network (EPC). The EPC is an example of a network which may comprise wired communication links, such as optical links 121, 121'. Asymmetric digital subscriber line (ADSL) communication networks 122 constitute another example or a wired communications network. ADSL may, e.g., be used to connect stationary users 150 to the core network 120.

The wireless access network 100 supports at least one radio access technology (RAT) for communicating 145, 145' with wireless devices 140, 140'. It is appreciated that the present disclosure is not limited to any particular type of wireless access network type or standard, nor any particular RAT. The techniques disclosed herein are, however, particularly suitable for use with 3GPP defined wireless access networks.

Radio communication 145, 145' takes place over a radio propagation channel. A radio propagation channel comprises a physical transmission medium and normally introduces one or more forms of distortion to the transmitted information. It is of interest to collect data samples associated with such impairments, in order to be able to predict future impairments that will affect users in similar communication scenarios.

Figure 7:
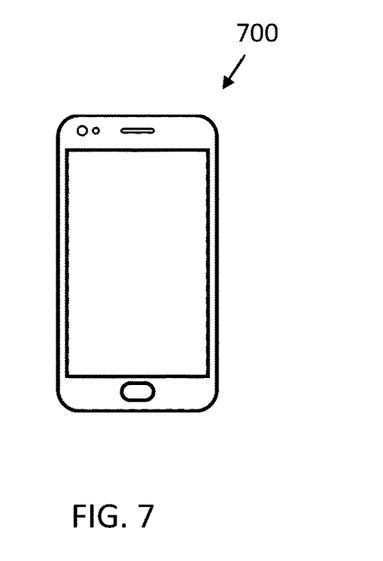
FIG. 7 shows an example wireless device.

FIG. 7 illustrates an example wireless device 700, this device may according to one example constitute the data collecting network node.

Figure 8:
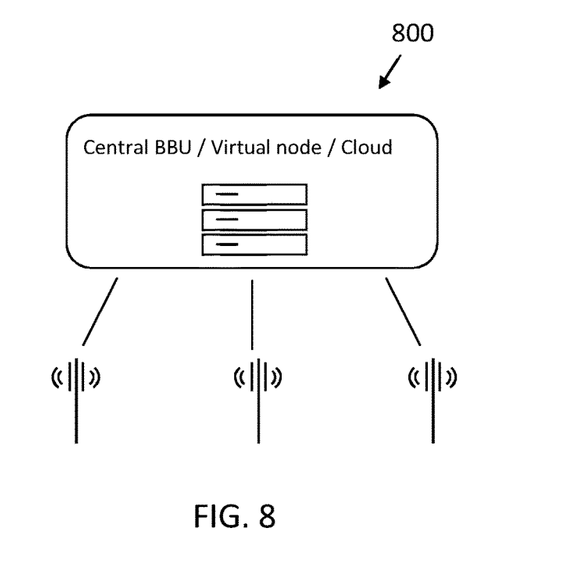
FIG. 8 schematically illustrates a communications network.

FIG. 8 illustrates a data processing network node 800, here exemplified as a central baseband unit (BBU). This node may of course also be realized as a virtual node or part of some cloud-based function as illustrated in FIG. 8.

There is an ongoing discussion in 3GPP on how to support Artificial Intelligence (AI) and Machine Learning (ML), see, e.g., the proposed study item description in RP-201304 "New SID: Study on further enhancements for data collection", RAN #88-e meeting, revision of RP-200770. The scope of the discussion is to study high level principles for RAN intelligence enabled by AI, the functional framework (e.g. the AI functionality and the input/output of the component for AI enabled optimization) and identify the benefits of AI enabled NG-RAN through possible use cases e.g. energy saving, load balancing, mobility management, coverage optimization.

It is appreciated that this type of processing may require large quantities of data in order to be really effective, and transporting this data over the network, in particular over bandwidth constrained wireless links, may result in prohibitive levels of signaling overhead.

The present disclosure evolves around methods and a framework for saving and adjusting collection of data samples for use in some form of ML-based operation. The method helps out in identifying relevant data samples that should be combined and stored for use in the ML processing. One of the key concepts disclosed herein is for a data processing node to instruct a data collecting node on how to collect data, and optionally also when to off-load the collected data. This way the data processing node can tailor the data sample reporting from different data collecting nodes to best suit the application and processing resources at hand. Different instructions can be issued for different ML operations at the data processing network node, and different instructions can also be issued to different types of data collecting network nodes, or data collecting network nodes in different communication scenarios, such as at different spatial locations or communicating in different frequency bands.

Figure 2A:
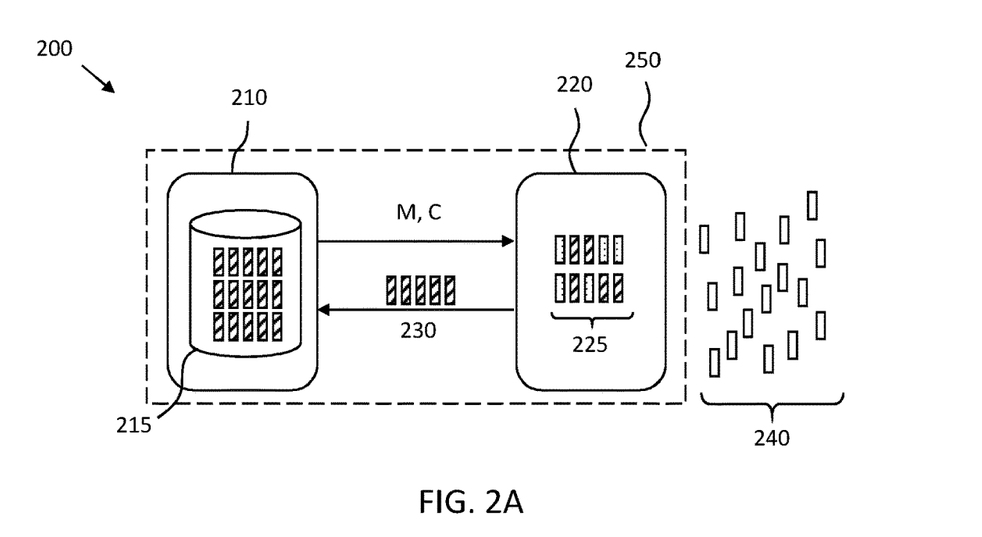
FIGS. 2A and 2B schematically illustrates data sample collection in a communication network.

FIG. 2A schematically illustrates a system 200 for collecting data comprising a data processing network node 210 and a data collecting network node 220. The data processing network node 210, and optionally also the data collecting network node 220, comprises a database 215 with data samples for some data processing task. A number of potentially "collectible" and "reportable" data samples 240 are conceptually shown in FIG. 2A. The data collecting network node 220 collects, i.e., samples, a subset 225 of the available data, and selects one or more of these collected data samples for reporting 230 to the data processing network node 210. It is appreciated that the two nodes 210, 220 may be physically collocated as modules of a single network node 250.

The data processing node sends a relevance metric M and a relevance criterion C to the data collecting network node 220. The relevance metric may also be pre-configured at the data collecting network node, e.g., as a default relevance metric to be used in case the data processing network node does not explicitly provide a metric. The data collecting network node may also store a number of different metrics, and the data processing network node can indicate which one to use for a given data collecting task. In general, a relevance metric M defines how relevance is to be measured for a data sample 240, while the relevance criterion C defines what constitutes a relevant data sample. Examples of this relevance metric will be discussed in more detail below. Having knowledge of the metric M and the criterion C enables the data collecting node to collect (and optionally also to pre-process) data samples 225 according to the instructions of the data processing network node 210. Thus, the data samples 230 reported back to the data processing network node are efficiently reported, where efficiency is defined by the system 200, and may be application specific as well as time-varying. For instance, efficiency may be measured in terms of consumed communication resources such as bandwidth and/or time, reporting delay, and/or in terms of the performance of the data processing operation at hand. One common data processing operation is some form of prediction based on measured data. Different relevance metrics M and relevance criteria C may be issued to different data collection network nodes, and several metrics and criteria may also be issued to a single data collecting network node, for instance in case the data collecting network node collects data samples for more than one predictive function.

Figure 3:
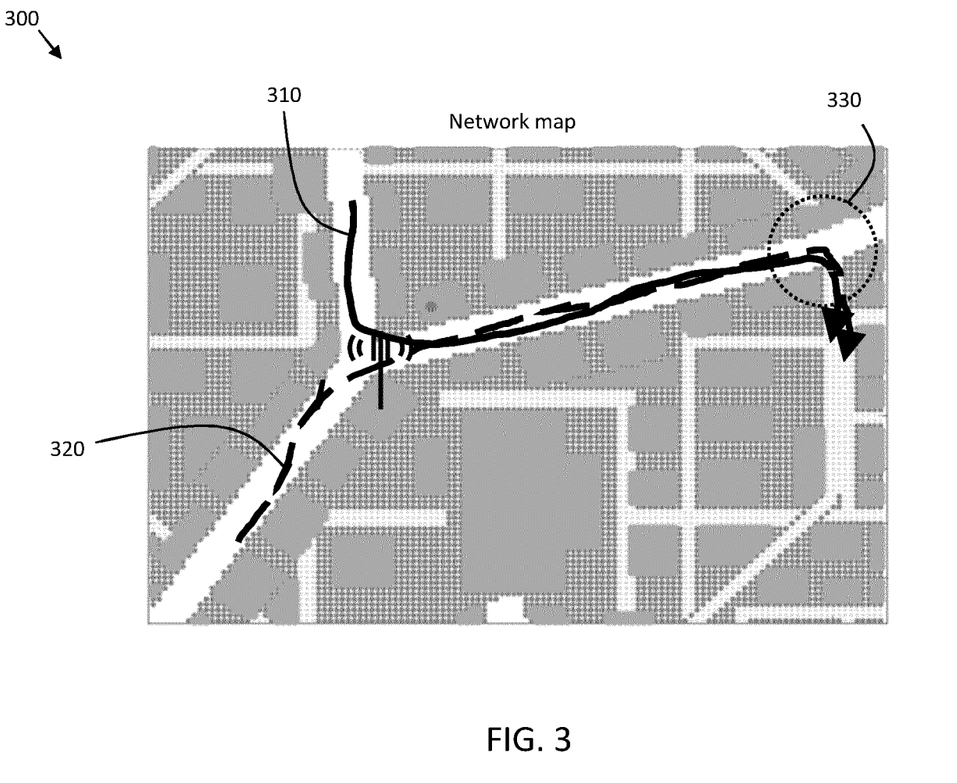
FIG. 3 shows an example where the herein disclosed techniques are applicable.

An example of a predictive function is given in FIG. 3. A first wireless device 310 and a second wireless device 320 measures Reference Signal Receive Power (RSRP) measurements on one or more carriers as function of device location. A predictive function such as an AI model or ML model can be trained for example to use a time-series of RSRP measurements to predict a future signal quality. WO2020226542 A1 provides background material and discusses the training of these types of systems. The techniques disclosed in WO2020226542 A1 are at least partly applicable also to the examples disclosed herein. In the example 300, the two wireless devices are turning around the same corner 330 according to the location plot and experience a drop in signal strength when doing so. The first wireless device 310 first turns around the corner and experiences a large signal quality drop. The idea is then to use the predictive function to predict the drop in signal power at the second wireless device 320, and mitigate this drop, e.g., by a change of carrier or adjustment in communications resource assignment like the assignment of a stronger channel code. According to the currently proposed methods, the network can, based on the time-series of RSRP data, use the pattern similarities to take a decision on how to handle any new RSRP time-series data sample measurements. For example, it may be sufficient to use one set of data from one of the wireless devices since the time-series data sets if the RSRP data sets are similar. In other words, if one wireless device has reported a measurement for a given path, then another wireless device need not report the same measurement, as this would not contribute with very much additional information to the already existing data samples in the database 215.

Figure 5:
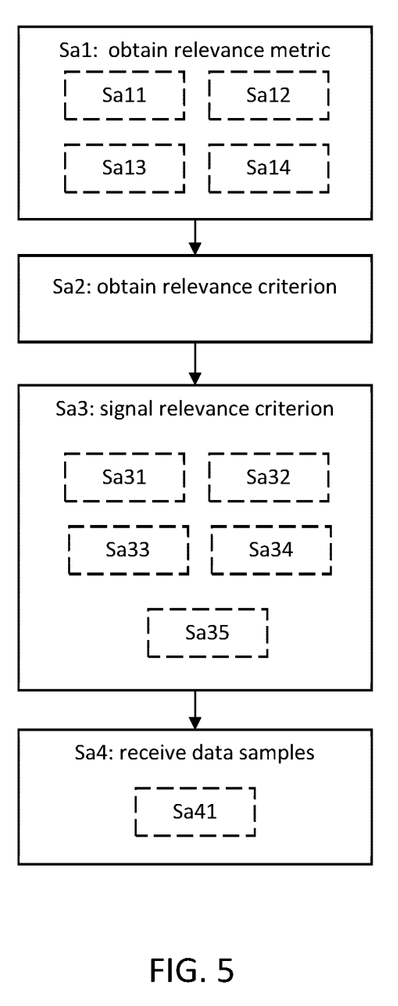
FIGS. 5, 6 are flow charts illustrating methods.

FIG. 5 is a flow chart illustrating one such computer-implemented method, performed in a data processing network node 210, for acquiring new data samples 230 and for maintaining a set of data samples in a database 215, wherein the set of data samples are configured to form input to a function associated with a predictive performance. The method comprises obtaining Sa1 at least one relevance metric M, where the relevance metric is indicative of an increase in the predictive performance of the function when using a data sample as input together with the set of data samples 215 compared to when not using the data sample. The method also comprises obtaining Sa2 a relevance criterion C, where the relevance criterion identifies relevant data samples in a set of data samples based on the at least one relevance metric. The method further comprises signaling Sa3 the relevance criterion C to a data collecting network node 110, 120, 130, 140, 150, 220, and receiving Sa4 one or more data samples 230 from the data collecting network node, where the received data samples are associated with relevance metrics M that satisfy the relevance criterion C.

Figure 2B:
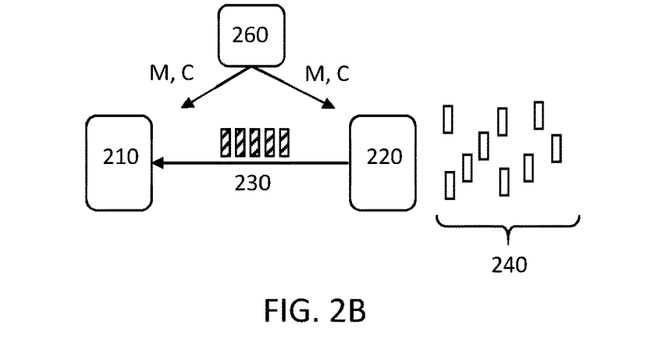

The at least one relevance metric M may according to one example be signaled Sa34 to the data collecting network node, or it can be pre-configured Sa35 at the data collecting network node. It is furthermore noted that the signaling of the relevance criterion C to the data collecting network node may be performed via some other network node. For instance, a configuration network node 260 may be in charge of parameterizing, i.e., setting up, the data processing operation at the data collecting network node and at the data processing network node. This configuration network node 260 then signals the relevance metric M and/or the relevance criterion C to the data collecting network node and/or to the data processing network node, as schematically illustrated in FIG. 2B. It is furthermore appreciated that any of the data collecting network node, the configuration network node, and the data processing network node may be co-located on the same physical entity, or they can be implemented on two physically separate entities, or they can be distributed over more than two entities.

Figure 6:
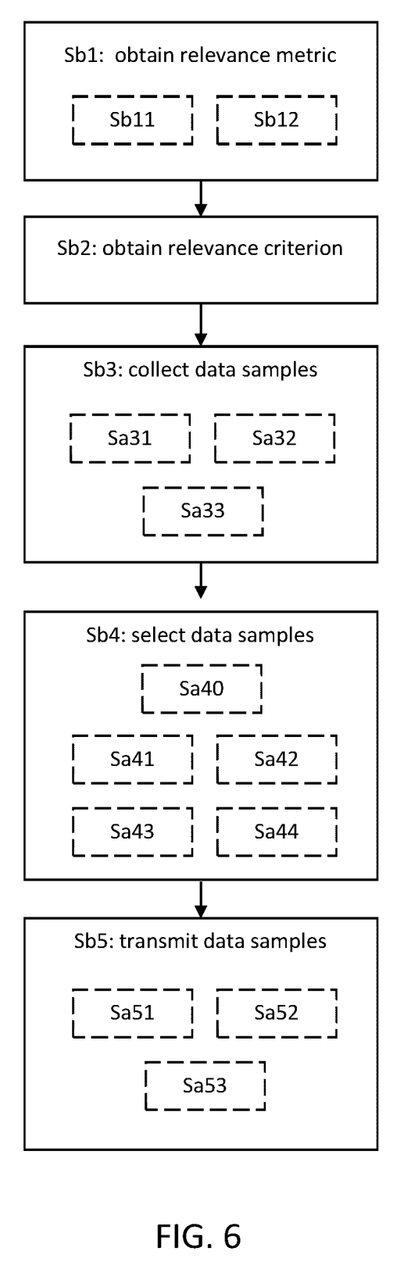

FIG. 6 is a flow chart illustrating a corresponding computer-implemented method for acquiring new data samples 230 and for maintaining a set of data samples in a database 215 is performed in the data collecting network node 220. The method comprises obtaining Sb1 at least one relevance metric M, where the relevance metric is indicative of an increase in the predictive performance of the function when using the new data sample as input. The method also comprises obtaining Sb2 a relevance criterion C from the data processing network node or from a configuration network node 260, where the relevance criterion identifies relevant data samples in a set of data samples based on the at least one relevance metric. The method further comprises collecting Sb3 a set of collected data samples 225 by the data collecting network node, selecting Sb4 one or more relevant data samples from the set of collected data samples based on the relevance metric M and on the relevance criterion C, where the relevant data samples are associated with relevance metrics meeting the relevance criterion, and transmitting Sb5 the one or more selected data samples 230 to the data processing network node.

The at least one relevance metric M can be pre-configured Sb11 at the data collecting network node, and/or at least in part received Sb12 from the data processing network node. Of course, the relevance criterion may also be received from some other network node configured to parameterize the data sample collection process.

It is appreciated that the methods disclosed herein can also be performed in any of the network nodes 110, 120, 130, 140, 150 discussed above in connection to FIG. 1. The two methods of FIG. 5 and FIG. 6 can also of course be performed in the same network node 250 as mentioned above in connection to FIG. 2A, in which case efficient data collection and processing is enabled in a single node.

The relevance metric M may, as discussed above, take on many forms, and can be different for different applications. The method may, for instance, comprise training Sa11 a machine learning model arranged to indicate the predictive performance associated with a data sample in a set of collected data samples 225. In this case the relevance metric M comprises the machine learning model itself. For example, one can use a trained model to identify or determine the novelty of a given data sample based on the prediction error of the model. For example, in case the data-processing node receives a sample (x,y), where also the model can predict an estimate of y based on x. The novelty of the sample would then be indicated by the model error, i.e., the difference between the true value of y and its estimate. In one example, this can comprise performing an inter-frequency measurement based on predicted good coverage, using source carrier measurements (x). Next, when the UE actually performs the measurement, it receives y and can evaluate how good the model is. This means that the machine learning model is communicated in some way to the data collecting network node. This can be performed, e.g., by signaling which model out of a set of pre-trained models to use when collecting data of a given type, or a new model can be transmitted to the data collecting network node.

The decision on how to rate (in terms of importance) a new data sample for a given existing dataset can be based on a function which outputs a distance metric. Thus, optionally, at least one relevance metric M comprises a distance metric d configured to quantify a distance between one or more data samples in a set of collected data samples and a set of samples in the database.

One such example function is the weighted Euclidian distance compared to the other samples in the database 215. The weighted Euclidian distance d, this can be calculated for n features by:

$$d = \sqrt{\sum_{i=1}^{n} w_i(x_a - x)^2}, \quad d \in D$$

Another type of decision criterion could be based on some of the available distance metrics in the literature. Some non-limiting examples include Manhattan (L1-norm), Euclidean (L2-norm), Minkowski, Cosine and Chebychev type of distance metrics.

In case of supervised learning, the data collecting network node 220 compares the distance d with the samples within its own target class. In the literature there are many techniques that can use the distance to reach a decision on the importance of a sample and this disclosure does not exclude one of them. Some non-limiting examples include density-based approaches, proximity approaches (maximum distance to other points, average distance to other points etc.) or in case of regression, only the samples within a range of its target regression variable are being used. Another alternative will be to pick measurements that do not reduce the overall goodness of the fit.

Another ML-based decision criterion would be to train a model to directly identify or determine the novelty of a given data sample. In this case, the decision is not based on a distance metric or the like, as previously described, but the model would indicate "how novel" the current data sample is. This approach voids the need to store a large number of samples to calculate point-to-point distances or a set of patterns, and only a single neural network would be required which is an advantage. This approach can be enabled using Random Network Distillation (RND) to train the model. Furthermore, this solution could either be associated with a dataset (trained with all points on the dataset to identify the novel samples) or with specific deployed models (trained with the same samples used during the training of that specific model) in this case, the network would identify data samples that are unknown to that specific model. The training of such a model could be done either periodically over the new data set, or in the case of an RND directed associated with a model, it would be trained in parallel with that model. RND methods are discussed, e.g., in the article "EXPLORATION BY RANDOM NETWORK DISTILLATION" by Yuri Burda, Harrison Edwards, Amos Storkey, and Oleg Klimov, 30 Oct. 2018, arXiv:1810.12894v1.

Thus, in other words, the methods may also comprise training Sa12 a machine learning model arranged to indicate a novelty metric associated with a data sample in a set of collected data samples 225. The machine learning model then constitutes the relevance metric M and may also be said to constitute the relevance criterion C since it also determines if a data sample is relevant or not for the data processing task at hand. According to some aspects, the method may also comprise updating Sa13 the machine learning model based on the received one or more data samples 230. The method may further comprise updating Sa14 the function associated with a predictive performance based on the received one or more data samples 230. The relevance metric M may furthermore comprise a reconstruction error metric value obtained from an autoencoder model. The autoencoder can be used to represent the current samples at the data processing network node, and a high reconstruction error for any obtained samples at the collecting nodes then indicate a novel, i.e., important, sample. High reconstruction error corresponds to a large relevance metric.

According to other aspects, the at least one relevance metric M comprises a prediction error metric value obtained from a machine learning, ML, model. For example, the model can forecast future signal quality values, and the data collecting network node can compare the forecasted value with the actual measured and include those time-series of samples that generated a high prediction error. The relevance metric is hence related to the machine learning model prediction error. In this case, the function associated with a predictive performance is same as the ML model used to determine the relevance metric.

Figure 4:
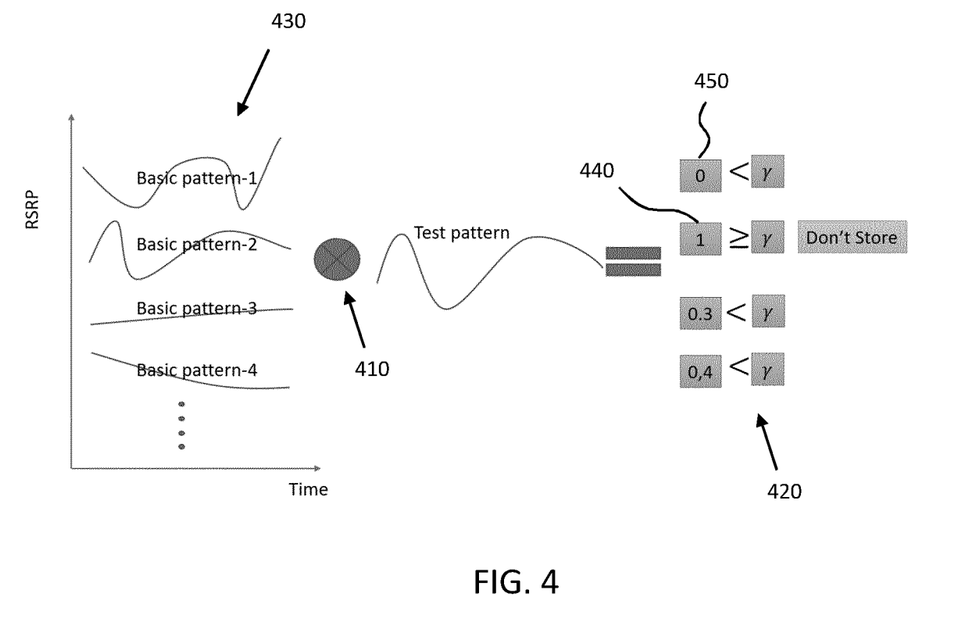
FIG. 4 illustrates an example of determining a relevance metric.

According to other aspects, with particular reference to FIG. 4, the at least one relevance metric M can be based on a cyclo-stationarity operation 410 configured to indicate a similarity between one or more data samples in a set of collected data samples a set of basic patterns stored in the database or in some other test set and. This decision criterion for classifying data samples in terms of importance or relevance considers a group of samples (e.g., in spatial domain and/or in frequency domain) or series of samples (in-time domain). A node, normally the data collecting network node 220 conducts a cyclostationarity operation on a group of samples (referred to herein as a test pattern) against a number of pre-determined existing basic patterns (which are stored at the node), as illustrated in FIG. 4. The cyclo-stationarity operation can be an auto-correlation function or a cross-correlation function. The basic patterns are considered individually for each period of time or geographical location samples. For instance, for time $t_0$ to $t_N$ we have basic patterns 430 of $P_{n0}$ to $P_{nX}$, whereas for time $t_{N+1}$ to $t_M$ we have basic patter of $P_{n0}$ to $P_{nY}$ For instance, cyclostationarity similarity between patterns can be calculated as the auto-correlation between the existing pattern 'x' and the pattern to be tested 'y'.

$$S_{x,y}^T(t) = \lim_{T \to \infty} \frac{1}{T} E[R_x(t) R_y(t - T)]$$

High similarity increases $S_{x,y}^T(t)$, see, e.g., example 440 while low similarity reduces $S_{x,y}^T(t)$, see, e.g., example 450 in FIG. 4. This relevance metric can be compared to a relevance criterion, indicated as γ in FIG. 4, and a decision on a course of action for a given data sample is made based on a comparison of the relevance metric value to the relevance criterion.

A node (or network) may define new patterns (to be considered as a new basic pattern) if the corresponding eigenvector shows full or partial orthogonality to existing basic patterns. If a data sample is found to have a high degree of similarity when compared to the basic patterns, it may not be deemed relevant for the task at hand and can therefore be ignored. Having observed more than one "instance" of a given pattern can be remembered, e.g., by increasing a weight parameter associated with the basic pattern. Each basic pattern can also be associated with a frequency variable indicating the statistics of the determined cyclo-stationarity measures.

The methods disclosed herein may furthermore comprise signaling Sa31 the at least one relevance metric M and the relevance criterion C, over a Physical Downlink Control Channel (PDCCH) of a third generation partnership program (3GPP) communications network. According to other aspects, the method comprises signaling Sa32 the at least one relevance metric M and the relevance criterion C as a Radio Resource Control (RRC) reconfiguration message of a 3GPP communications network or signaling Sa33 the at least one relevance metric M and the relevance criterion C as a dedicated message over a Physical Downlink Shared Channel (PDSCH) of a 3GPP communications network. These communications channels are resource constrained. The methods proposed herein reduce the communication requirements in terms of bits/sec, which is an advantage.

It is noted that the data collecting network node 220 may also signal additional information in addition to the selected samples deemed as relevant. For instance, the method optionally comprises receiving Sa41 one or more relevance metrics associated with the data samples 230 received from the data collecting network node. A relevance metric may optionally comprise a machine learning model arranged to indicate a predictive performance associated with a data sample in the set of collected data samples 225.

The selecting operation may be performed in a number of different ways, which ways can of course also be combined for additional advantages. For instance, the selecting may comprise adding Sb41 the one or more relevant data samples to the database 215, deleting Sb42 one or more previously collected data samples from the database 215, and/or increasing Sb43 a data sample importance metric value associated with a data sample in the database 215.

In one embodiment, a weight or importance value is stored for each sample in the dataset, i.e., the dataset consists of tuples ([[$x_1$, $w_1$]; [$x_2$, $w_2$], . . . , [.$x_n$, $w_n$]]) where $x_i$ is the i-th data sample and $w_i$ is its corresponding weight or importance value. The weight of a sample can be increased if a new sample is the closest in terms of a certain distance criterion. For example, the method may comprise increasing the value of $w_1$ if a new sample is close in some distance measure to $x_1$ of the database samples, or at least within some threshold range of $x_1$. Consequently, the herein disclosed methods may comprise transmitting Sb51 a data sample relevance metric value and/or data sample importance metric value, associated with the selected data samples 230 to the data processing network node.

The methods disclosed herein may furthermore comprise transmitting Sb52 data indicative of a number of added and/or deleted data samples of the database to the data processing network node, as well as transmitting Sb53 information indicative of one or more generated artificial data samples in the database to the data processing network node. This means that the weight parameter can be extended to include also additional items of information. The data processing network node 210 may request this information, and the data collecting network node may respond if it has the ability to do so. For instance, the data collecting network node 220 may adapt its data collecting processes to accommodate requests received from the data processing network node 210.

The sample weights discussed above can have an advantageous effect on the model training, for example by including the sample weights in the optimization function of the predictive function. A sample with high weight may be interpreted as, e.g., more frequently occurring, and by adding higher importance to a prediction that will be more frequently performed, the overall prediction performance tends to increase. A typical optimization is to minimize the mean squared error of the model output and the true value. I.e.

$$MSE = \frac{1}{N}\Sigma(f(x) - y_{true})^2$$

where $y_{true}$ is the desired output for a given input x, $f(x)$ is the output of the predictive function and where the MSE is calculated for all stored N samples. A sample weight $w_s$ can be included by adding the sample weight as a factor:

$$MSE_w = \frac{1}{N}\sum_s w_s(f(x_s) - y_{true\_s})^2$$

where the weighted MSE is calculated for all stored N samples.

The data collecting network node (and potentially also the data processing network node) can also perform clustering metrics such as k-means or the like to reduce the database to k samples. The data collecting network node can according to one example be configured with a clustering method to reduce its database of samples. As a non-limiting example, the node can be configured to produce k-samples using the k-means method. Other examples can be clustering, self-organizing maps and principal component analysis. Thus, the selecting may comprise creating Sb44 one or more artificial data samples with a specified data sample importance metric value by combining one or more collected data samples with one or more data samples in the database. A flag or indicator variable can of course be added to the data samples which indicates which data samples were generated artificially.

In the literature known techniques that can be used for sample(s) generation and provided here as non-limiting examples include probabilistic models, classification-based imputation models, and generative adversarial neural networks. Different quality metrics are typically used to rate the performance of the above techniques that can be used to assess which technique is more appropriate for the specific use-case.

In case the database can only store a certain number of N samples (or a wireless device can only report N samples), and the new sample(s) gives a total population of N+X samples then the network has to discard or delete X samples to keep the population to the size of N. The selection of which points to be picked (N) or be deleted (X) can be done according to different methods. For picking N number of samples where the summed Euclidian distance of all sample-pairs is maximized can be used. Another method is to use the aforementioned the ML model prediction if present as a decision criterion, to remove samples that already have an accurate prediction. In general, the methods disclosed herein may also comprise triggering Sb40 data sample selection and transmission based on a trigger criterion comprising any of a change in mode of operation (such as a wireless device entering an idle mode of operation), a memory status, and/or based on an external instruction (perhaps received from the data processing network node if this node is in need of additional data for some given predictive task at hand). Alternatively, for finding the points X that need to be deleted goodness of fit, confidence interval, or Kolmogorov-Smirnov tests and techniques are typically used.

Figure 9:
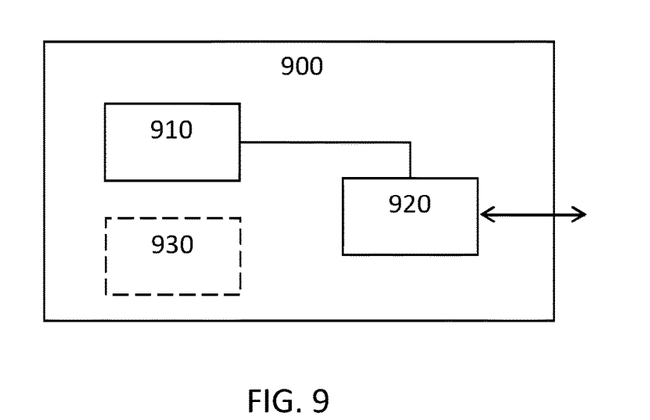
FIG. 9 schematically illustrates processing circuitry.

FIG. 9 schematically illustrates a device 900 comprising a number of functional units. The device 900 embodies a network node 110, 120, 130, 140, 150, 210 according to embodiments of the discussions herein, in terms of functional units of the device 900. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the device 900 to perform a set of operations, or steps, such as the methods discussed in connection to FIG. 8 and the discussions above. For example, the storage medium 930 may store the set of operations, and the processing circuitry 910 may be configured to retrieve the set of operations from the storage medium 930 to cause the device to perform the set of operations. The set of operations may be provided as a set of executable instructions. Thus, the processing circuitry 910 is thereby arranged to execute methods as herein disclosed. In other words, there is shown a network node 110, 120, 130, 140, 150, 210 comprising processing circuitry 910, a network interface 920 coupled to the processing circuitry 910 and a memory 930 coupled to the processing circuitry 910, wherein the memory comprises machine readable computer program instructions that, when executed by the processing circuitry, causes the network node to perform operations as discussed herein.

The storage medium 930 may also comprise persistent storage, which, for example, can be any single one or combination of magnetic memory, optical memory, solid state memory or even remotely mounted memory.

The device 110, 120, 130, 140, 150, 210 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the device 110, 120, 130, 140, 150, 210, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
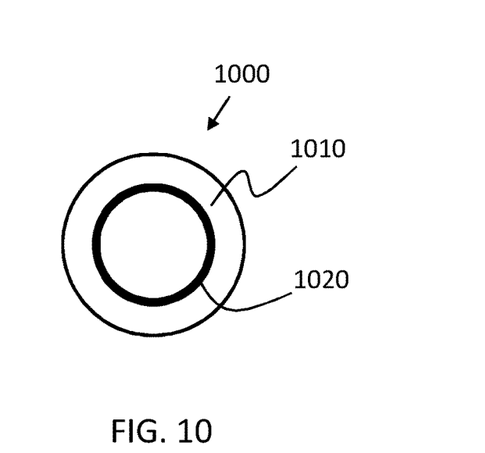
FIG. 10 shows a computer program product.

FIG. 10 illustrates a computer readable medium 1010 carrying a computer program comprising program code means 1020 for performing the methods illustrated in, e.g., FIGS. 5 and 6, when said program product is run on a computer. The computer readable medium and the code means may together form a computer program product 1000.

The invention claimed is:

1. A computer-implemented method, performed in a data processing network node, for acquiring new data samples and for maintaining a set of data samples in a database, wherein the set of data samples are configured to form input to a function associated with a predictive performance, the method comprising
obtaining at least one relevance metric, where the relevance metric is indicative of an increase in the predictive performance of the function when using a data sample as input together with the set of data samples compared to when not using the data sample,
obtaining a relevance criterion, where the relevance criterion identifies relevant data samples in a set of data samples based on the at least one relevance metric,
signaling the relevance criterion to a data collecting network node, and
receiving one or more data samples from the data collecting network node, where the received data samples are associated with relevance metrics that satisfy the relevance criterion; and
training a machine learning model arranged to indicate a novelty metric associated with a data sample in a set of collected data samples, wherein the machine learning model constitutes a relevance metric of the at least one relevance metric.

2. The method according to claim 1, comprising signaling the at least one relevance metric to the data collecting network node.

3. The method according to claim 1, wherein the relevance metric is pre-configured at the data collecting network node.

4. The method according to claim 1, comprising training a machine learning model arranged to indicate the predictive performance associated with a data sample in a set of collected data samples, wherein the machine learning model constitutes a relevance metric.

5. The method according to claim 4, comprising updating the machine learning model based on the received one or more data samples.

6. The method according to claim 1, comprising updating the function associated with a predictive performance based on the received one or more data samples.

7. The method according to claim 1, wherein the at least one relevance metric comprises a distance metric configured to quantify a distance between one or more data samples in a set of collected data samples and a set of samples in the database.

8. The method according to claim 1, wherein the at least one relevance metric comprises a reconstruction error metric value obtained from an autoencoder model.

9. The method according to claim 1, wherein the at least one relevance metric comprises a prediction error metric value obtained from a machine learning (ML) model.

10. The method according to claim 1, wherein the at least one relevance metric is based on a cyclo-stationarity operation configured to indicate a similarity between one or more data samples in a set of collected data samples and a set of basic patterns.

11. The method according to claim 10, wherein the cyclo-stationarity operation is an auto-correlation function or a cross-correlation function.

12. The method according to claim 1, comprising signaling the at least one relevance metric and the relevance criterion over a Physical Downlink Control Channel (PDCCH) of a third generation partnership program (3GPP) communications network.

13. The method according to claim 1, comprising signaling the at least one relevance metric and the relevance criterion as a Radio Resource Control (RRC) reconfiguration message of a third generation partnership program (3GPP) communications network.

14. The method according to claim 1, comprising signaling the at least one relevance metric and the relevance criterion as a dedicated message over a Physical Downlink Shared Channel (PDSCH) of a third generation partnership program (3GPP) communications network.

15. The method according to claim 1, comprising receiving one or more relevance metrics associated with the data samples received from the data collecting network node.

16. A computer program comprising program code means for performing a method according to claim 1 when said program is run on a computer or on processing circuitry of a network node.

17. A computer program product comprising a computer program according to claim 16, and a computer readable means on which the computer program is stored.

18. A computer-implemented method, performed in a data collecting network node, for acquiring new data samples and for maintaining a set of data samples in a database at a data processing network node, wherein the set of data samples forms input to a function associated with a predictive performance, the method comprising
- obtaining at least one relevance metric, where the relevance metric is indicative of an increase in the predictive performance of the function when using the new data sample as input,
- obtaining a relevance criterion from the data processing network node, where the relevance criterion identifies relevant data samples in a set of data samples based on the at least one relevance metric,
- collecting a set of collected data samples by the data collecting network node,
- selecting one or more relevant data samples from the set of collected data samples based on the relevance metric and on the relevance criterion, where the relevant data samples are associated with relevance metrics meeting the relevance criterion, and
- transmitting the one or more selected data samples to the data processing network node and training a machine learning model arranged to indicate a novelty metric associated with a data sample in a set of collected data samples, wherein the machine learning model constitutes a relevance metric of the at least one relevance metric.

19. A network node, comprising:
- processing circuitry;
- a network interface coupled to the processing circuitry; and
- a memory coupled to the processing circuitry, wherein the memory comprises machine readable computer program instructions that, when executed by the processing circuitry, causes the network node to perform a method according to claim 18.

* * * * *